No. 862,435. PATENTED AUG. 6, 1907.
W. P. BARTEL.
RIVET.
APPLICATION FILED JAN. 5, 1907.
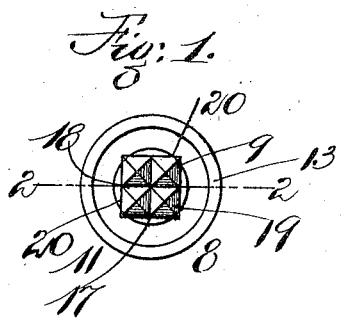
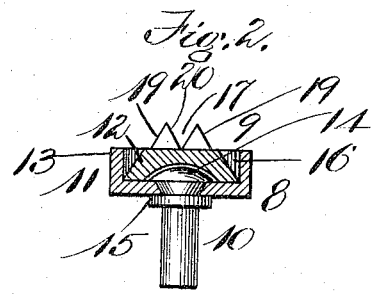
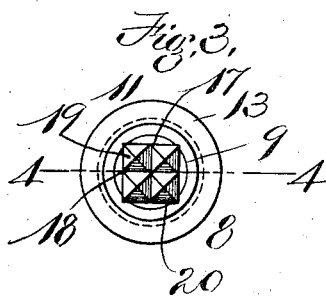
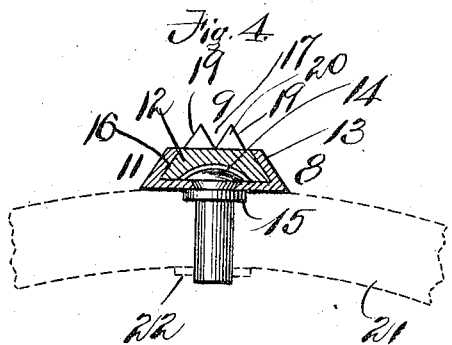
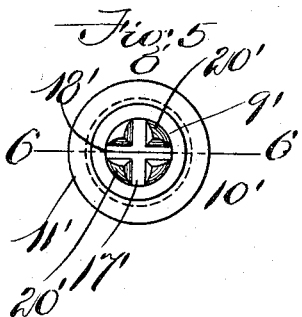
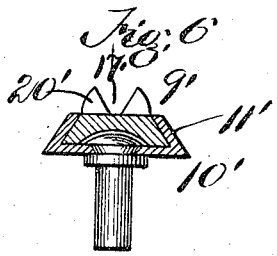
Witnesses: Inventor:
William P. Bartel,
by his attorney

UNITED STATES PATENT OFFICE.

WILLIAM P. BARTEL, OF WALTHAM, MASSACHUSETTS, ASSIGNOR TO JUDSON L. THOMSON M'F'G COMPANY, A CORPORATION OF MAINE.

RIVET.

No. 862,435.  Specification of Letters Patent.  Patented Aug. 6, 1907.

Application filed January 5, 1907. Serial No. 350,873.

*To all whom it may concern:*

Be it known that I, WILLIAM P. BARTEL, a citizen of the United States, residing at Waltham, in the county of Middlesex and State of Massachusetts, have invented new and useful Improvements in Rivets, of which the following is a specification.

This invention relates to rivets which are particularly adapted to be used in connection with automobile tires for the purpose of preventing said tires from slipping or skidding upon slippery or muddy roads.

The object of the invention is to provide a rivet which can be cheaply and strongly manufactured, which can be readily attached to a piece of leather or rubber or other material suitable for the tire of a vehicle and which, when so attached, will be durable and will resist the hard wear and usage to which a device of this character is subjected in practical use.

The invention consists in a three-part rivet formed and constructed as hereinafter described and particularly as pointed out in the claims.

Referring to the drawings: Figure 1 is a plan view of my improved rivet, partly finished. Fig. 2 is a section, partly in elevation, taken on line 2—2 of Fig. 1. Fig. 3 is a plan view of the finished rivet. Fig. 4 is a section, partly in elevation, taken on line 4—4 of Fig. 3. Fig. 5 is a plan view of a modified form of my invention. Fig. 6 is a section, partly in elevation, taken on line 6—6 of Fig. 5.

Like numerals refer to like parts throughout the several views of the drawings.

In the drawings, the rivet 8 consists of three parts, the head 9, shank 10 and flange 11. In forming the rivet, the head 9 is preferably formed of hardened metal with a frusto-conical base 12. The flange 11 is formed of a disk of sheet metal with the portion adjacent to the periphery thereof first turned upwardly, as illustrated in Figs. 1 and 2, to form a rim 13, and this is fastened to the shank 10 by riveting the same thereon concentric therewith, said shank preferably being fastened to the flange 11 by means of the head 14 thereon and the flange 15 preferably integral with said shank. The rim 13 surrounds a recess 16 which, when the rivet is in the process of formation as in Fig. 2, is a cylindrical recess, but subsequently becomes a frusto-conical recess of the same size as the base 12 of the head 9, so that when the rim 13 is closed in around said base the base and flange 11 become as one part in so far as being securely locked one to the other is concerned. The upper face of the head 9 is provided with two intersecting grooves 17 and 18. The sides of said grooves preferably stand at an angle to the base 12 and the outer upper edge 19 of the head 9 is beveled, said beveled edge and the intersecting grooves thus forming pyramidal projections 20, 20.

The modified form of my invention illustrated in Figs. 5 and 6 varies from the form illustrated in Figs. 3 and 4 only in the shape of the projections 20' upon the head 9' and in the shape of the grooves 17' and 18' in said head, the flange 11' and shank 10' being substantially the same, said figures being introduced for the purpose of illustration and to set forth the fact that the particular form of the head may be varied without departing from the spirit of my invention.

The rivet is fastened to the tire or to the piece of material constituting in use a portion of the tread of said tire by riveting the same thereto as illustrated in dotted lines, Fig. 4, and in said figure 21 represents a portion of a tire and 22 represents a washer.

In use a suitable number of the rivets are fastened to the tire, as hereinbefore set forth, upon the tread portion of said tire, and the heads of said rivets project or cut into the surface of the road over which the vehicle is passing and prevent the wheels from slipping, either circumferentially or skidding sidewise.

One of the advantages secured by the construction of the rivet hereinbefore described is that by making the same in three parts a hard headed rivet can be obtained of any desired diameter and the shank can be made of any desired diameter—that is, a large head can be formed with a small shank, so that when the same is introduced through the leather or rubber it will cut away only a small amount of material and will not weaken or damage the tire for practical use.

Having thus described my invention, what I claim and desire by Letters Patent to secure is:

1. A rivet in three parts, a head, shank and flange, said shank riveted to said flange, said flange provided with a recess in its upper face and said head fitting in said recess.

2. A rivet in three parts, a head, shank and flange, said shank riveted to said flange, said flange provided with a frusto-conical recess in its upper face, and said head fitting in said recess.

3. A rivet in three parts, a head, shank, and flange, said shank riveted to said flange, said flange provided with a recess in its upper face and said head fitting in said recess and having a plurality of projections thereon.

4. A rivet in three parts, a head, shank and flange, said shank riveted to said flange, said flange provided with a recess in its upper face and said head fitting in said recess and having a plurality of pyramidal projections thereon.

5. A rivet in three parts, a head, shank, and flange, said shank riveted to said flange, said flange provided with a recess in its upper face and said head fitting in said recess and having a plurality of grooves in its upper face.

In testimony whereof I have hereunto set my hand in presence of two subscribing witnesses.

WILLIAM P. BARTEL.

Witnesses:
CHARLES S. GOODING,
ANNIE J. DAILEY.